G. CRISSON.
METHOD OF AND MEANS FOR DETECTING IRREGULARITIES IN TRANSMISSION LINES.
APPLICATION FILED OCT. 15, 1919.
1,392,815.
Patented Oct. 4, 1921.
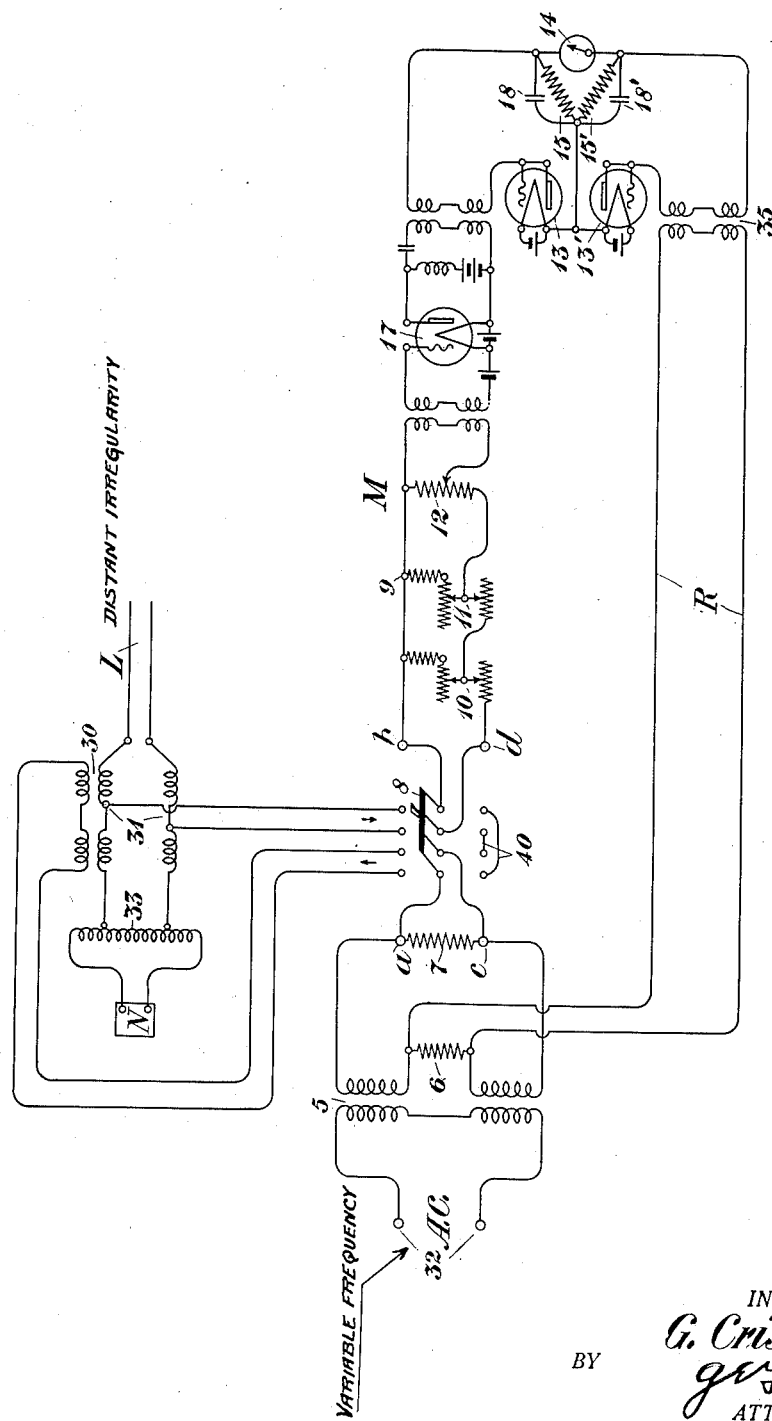
INVENTOR.
G. Crisson
BY
ATTORNEY

UNITED STATES PATENT OFFICE.

GEORGE CRISSON, OF HOBOKEN, NEW JERSEY, ASSIGNOR TO AMERICAN TELEPHONE AND TELEGRAPH COMPANY, A CORPORATION OF NEW YORK.

METHOD OF AND MEANS FOR DETECTING IRREGULARITIES IN TRANSMISSION-LINES.

1,392,815.      Specification of Letters Patent.      Patented Oct. 4, 1921.

Application filed October 15, 1919. Serial No. 330,838.

*To all whom it may concern:*

Be it known that I, GEORGE CRISSON, residing at Hoboken, in the county of Hudson and State of New Jersey, have invented certain Improvements in Methods of and Means for Detecting Irregularities in Transmission-Lines, of which the following is a specification.

This invention relates to methods of and means for detecting irregularities in transmission lines, and is described herein in connection with a long distance telephone line, it being understood, however, that the invention is not thus limited, being applicable to any kind of transmission line.

The faults in telephone lines may be divided into two classes with respect to their effects on telephone repeaters, viz: (a) irregularities at or very near the repeater station, and (b) irregularities distant from the station. The present invention is concerned with the detection and location of irregularities of the latter type.

When current is applied to a transmission line having an irregularity, part of the current is reflected by the irregularity to the sending station. The phase angle which the reflected current has when it reaches the station depends upon the length of the current wave and the distance of the irregularity from the station. Since the wave length depends upon the frequency of the current, it is obvious that when the frequency of the sending source is varied throughout a wide range, the reflected current differs in phase from the source periodically from zero degrees to 360°, so that at certain frequencies it augments the current from the source and at other frequencies decreases the same. A graph of the two currents combined plotted against frequency will therefore have a wavy shape, a crest recurring periodically at those frequencies at which the two currents are additive and a trough at those frequencies at which they are in opposition. The difference in frequency between successive waves, as for example, the distance between successive crests, is a measure of the distance between the irregularity and the source; and by mathematical proof it may be shown that $$S = \frac{V}{2\Delta f}$$

wherein S = the distance of irregularity from source, V = velocity of propagation of current waves over the line, and $\Delta f$ = frequency increment between successive waves. If the current from the source is large compared to the reflected current, the undulations in the current curve are of relatively small amplitude and difficult to ascertain, especially if minor other irregularities exist on the line. In case the two currents are about equal in value, however, the undulations are present to a marked degree and permit of accurate measurements. In this invention means are provided whereby the two currents are combined in the measuring device in such proportions that the undulations in the graph of the combined currents are pronounced and have sufficient amplitude to admit of accurate determination of the location of the irregularity.

A good understanding of the invention may be had from the following description thereof, considered in connection with the accompanying drawing, showing the diagrammatic view one form of apparatus embodying the same.

In this drawing reference character L designates a telephone transmission line having a distant irregularity the location of which is to be determined. N designates the network for balancing line L, this network having substantially the same characteristic impedance as the line when the same is in its normal condition, that is, when it has no irregularity. Line L and network N are associated for purposes of the test with the secondary windings of a three-winding transformer 30, an autotransformer 33 being interposed between the terminals of the said secondary windings and the network to change the impedance of the network as seen from the line and thus upset the balance which would normally exist between the line and the network. The action of the three-winding transformer is well understood in the telephone art. Briefly, current applied to the primary winding causes a flow of current in the secondary circuit, which current traverses the secondary windings in series so that the mid-points 31 thereof are at like potential and no current enters a circuit associated with the said mid-points, provided the drop in potential is the same across both pairs of the secondary terminals. Because of the unbalance caused by the autotransformer 33, a certain amount of current enters the circuit associated with terminals 31, herein termed the measuring circuit, the value of this current being dependent upon the extent of the unbalance. Moreover, because of the irregularity at the distant point of the transmission line a certain amount of the current entering the line is reflected from the irregularity and a portion of the reflected current also enters the measuring circuit. Two currents are thus caused to flow into the circuit associated with mid-points 31, one of which has the same phase as the current applied to line L and the other of which has a phase depending upon the distance of the irregularity from the source and upon the frequency of the current. When, therefore, the frequency of the source is varied throughout a wide range, the two currents in the measuring circuit will vary periodically in phase difference from zero to 360 degrees and a graph of the combined currents plotted against frequency will have a wavy shape. The distance to the irregularity may be determined by the difference in frequencies between successive waves in the manner explained hereinbefore.

In the form of embodiment of the invention shown in the drawing, the current in the circuit associated with the mid-points 31 is ascertained by means of an apparatus which is described in a co-pending application Serial No. 330812, by A. B. Clark filed of even date herewith. This apparatus, as explained in the said application, measures the value of current in the circuit associated with the said mid-points 31 relative to the value of current applied to the primary winding of transformer 30 and is so arranged that this ratio is expressed as the number of miles of standard cable which is equivalent in transmission efficiency to the circuit extending from the primary of transformer 30 to the mid-points of the secondary. When, therefore, the frequency of the source applied to the primary of transformer 30 is varied throughout a wide range, and the transmission equivalent of the above described circuit is ascertained throughout said range it will be found that the value of this equivalent will vary with frequency, and when plotted against frequency will have a wavy shape, similar to the current curve. The transmission curve may, therefore, be used for determining the distance of the irregularity from the sending end of the line.

Briefly the apparatus for determining the equivalent comprises a source of current 32 variable in frequency, associated with the primary of a transformer 5, the secondary circuit of which comprises resistances 6 and 7 in series with each other. A switch 8 is provided for associating the terminals of the resistance 7 with the primary side of the transformer 30, and for connecting simultaneously a measuring circuit M to the mid-points 31. Current proportional to the strength of the source is thus impressed on transformer 30 and current of a value determined by the transmission equivalent of the combination of the transformer with the line and the network, flows into the measuring circuit M. This circuit comprises an adjustable impedance device 9, preferably an artificial line, the transmission equivalent of which may be varied by means of dials 10 and 11. The current which passes through the device 9 is impressed by a potentiometer 12 on an amplifying element 17, the output current of this element being rectified by an electron tube 13 and caused to flow through a resistance 15. The drop in potential in this resistance depends upon the strength of the source 32, and to render the indicating device in the present arrangement unaffected thereby, there is provided a like resistance 15′ which is traversed by current from a rectifier 13′ associated by a reference circuit R with the resistance 6. Resistance 15 and 15′ are connected to each other at one end and associated by a galvanometer 14 at the other end, this galvanometer serving to indicate when the current in one resistance is equal to the current in the other. Condensers 18 and 18′ are connected in parallel with the resistances to improve the action of the galvanometer.

The transformer 30 may at times be disconnected from the apparatus by reversing switch 8, connections 40 being provided between the lower terminals of the switch to connect the measuring circuit directly to resistance 7 so that the full value of the current is impressed on circuit M for purposes of calibration, as will now be explained.

To calibrate the measuring circuit switch 8 is thrown to its lower position so that the circuit M is in direct connection with the resistance 7. The source of current is then regulated to give the desired frequency and the dials 10 and 11 are turned to the position at which the artificial line 9 causes a maximum loss of transmission in circuit M. Potentiometer 12 is then adjusted until the current flowing through the resistances 15 and 15′ are equal, as indicated by the pointer of the galvanometer standing at zero.

To make a measurement of the transmission from the primary of transformer 30 to the mid-points 31, switch 8 is thrown to close its upper contacts, so that the current from the source is impressed on the transformer 30. The current which now flows through resistance 15 is less than the current which flowed therethrough during the calibration of the apparatus, so that the galvanometer needle is thrown off its zero position. The transmission equivalent of line 9 is then reduced by rotating the dials 10 and 11 until the current in the measuring circuit is restored to its prior value as indicated by the return of the galvanometer needle to its middle position. The dials 10 and 11 are calibrated to indicate the number of miles by which the equivalent of the artificial line has been reduced, this quantity being equal to the transmission equivalent of the circuit extending from the primary of the transformer 30 to the mid-points of its secondary.

This equivalent is measured for a wide range of frequencies of source 32 and a graph is made in which the values of the equivalent are plotted as ordinates and the frequencies as abscissæ. This graph will be found to have a wavy shape, if there is a distant irregularity on the line, and the distance of the irregularity may be calculated from the frequency increment between successive waves in the manner explained hereinbefore.

It has been found in practice that an autotransformer having an impedance ratio of 4 to 3 gives well-defined undulations; any other adjustment of the transformer may of course be made to secure the desired results. The unbalance may also be secured by substituting for the network and auto-transformer another impedance of suitable characteristics, as readily understood.

Although only one form and arrangement of apparatus embodying the invention is shown and described herein, it is readily understood that various changes and modifications may be made therein within the scope of the following claims without departing from the spirit and scope of the invention.

What is claimed is:

1. The method of testing a line for a distant irregularity which consists in so associating a circuit with said line and its network that the transmission of the circuit is governed by the unbalance between the line and the network, causing an unbalance between the line and the network, varying the frequency of current in said circuit through a predetermined range, and ascertaining the transmission of said circuit throughout said range of frequencies.

2. The method of testing a line for a distant irregularity which consists in applying a source of current to said line, causing current reflected from the irregularity in the line to enter a measuring circuit, causing current having a definite phase relation to the source also to enter said circuit, and determining the phase relationship of said currents.

3. The method of testing a line for a distant irregularity which consists in applying a source of current to said line, associating a circuit with said line so that reflected current therein will enter the circuit, causing current having a definite phase relation to said source also to enter said circuit, and ascertaining the variations of the current in the said circuit throughout a range of frequencies.

4. The method of testing a line for a distant irregularity which consists in associating said line and its network with a circuit in such manner that the transmission of said circuit is governed by the unbalance between the line and the network, changing the impedance of said network to cause a certain unbalance between the line and the network, determining the transmission of said circuit for a range of frequencies, and ascertaining the frequency increment between periodic changes in the transmission of said circuit.

5. The method of testing a line for a distant irregularity which consists in associating said line with the secondary windings of a transformer, associating a network with said secondary windings in balancing relationship to said line, interposing a device between said network and said secondary windings to change the impedance of said network relative to said line, and determining the transmission from said primary winding to a circuit associated with the mid-points of said secondary windings throughout a range of frequencies.

6. In an apparatus for testing a line for an irregularity, the combination of a network for balancing said line, a circuit, means for governing the transmission of said circuit by the extent of unbalance between the line and the network, a device for causing an unbalance between the line and the network, means for varying the frequency of current in said circuit, and means for ascertaining the transmission of said circuit throughout a range of frequencies.

7. In an apparatus for testing a line for a distant irregularity, the combination of a source of current for said line, a circuit associated with said line to receive current reflected from the irregularity in the line, means for causing current having a definite phase relation to said source also to enter said circuit, and a device for determining the relative phase of said currents throughout a range of frequencies.

8. An apparatus for testing a line for a distant irregularity comprising a device having an impedance substantially in constant proportion to the impedance of the line, a circuit comprising a source of current, means for governing the current flowing through said circuit by the extent of the unbalance between the line and the said device, and means for ascertaining the value of current in the said circuit.

9. The method of testing a line for a distant irregularity, which consists in comparing a sending current with respect to phase relation with the current reflected back by the irregularity.

10. The method of testing a line for a distant irregularity, which consists in comparing various frequencies of sending current with the current reflected back by the irregularity.

11. The method of testing a line for a distant irregularity, which consists in varying a sending current over a certain frequency range and comparing it with respect to phase relation with the current reflected back by the irregularity.

In testimony whereof I have signed my name to this specification this 14th day of October, 1919.

GEORGE CRISSON.